United States Patent
Wegner-Donnelly et al.

(10) Patent No.: US 8,244,419 B2
(45) Date of Patent: Aug. 14, 2012

(54) MARINE POWER TRAIN SYSTEM AND METHOD OF STORING ENERGY IN A MARINE VEHICLE

(75) Inventors: Frank Wegner-Donnelly, North Vancouver (CA); John David Watson, Evergreen, CO (US)

(73) Assignee: Mi-Jack Canada, Inc., Hazel Crest, IL (US)

(*) Notice: Subject to any disclaimer, the term of this patent is extended or adjusted under 35 U.S.C. 154(b) by 1298 days.

(21) Appl. No.: 11/923,254

(22) Filed: Oct. 24, 2007

(65) Prior Publication Data
US 2008/0182466 A1 Jul. 31, 2008

Related U.S. Application Data

(60) Provisional application No. 60/862,728, filed on Oct. 24, 2006.

(51) Int. Cl.
- B60L 3/00 (2006.01)
- G06F 7/00 (2006.01)
- B60W 10/04 (2006.01)
- B61C 3/00 (2006.01)
- F02D 29/06 (2006.01)
- H02J 1/00 (2006.01)
- H02P 3/14 (2006.01)

(52) U.S. Cl. ............ 701/21; 701/36; 440/1; 440/3; 440/6; 440/50; 440/84; 440/85; 440/87; 105/61; 290/3; 290/31; 290/40 C; 307/9.1; 307/10.1; 307/43; 307/71; 307/80; 307/85; 318/139; 318/154; 318/376

(58) Field of Classification Search .............. 701/21; 440/84
See application file for complete search history.

(56) References Cited

U.S. PATENT DOCUMENTS

| 4,188,790 A | * | 2/1980 | Pedersen | 60/483 |
| 5,199,912 A | * | 4/1993 | Dade et al. | 440/6 |
| 5,863,228 A | * | 1/1999 | Tether | 440/6 |

(Continued)

FOREIGN PATENT DOCUMENTS

CA 2431354 6/2002

(Continued)

OTHER PUBLICATIONS

U.S. Appl. No. 60/745,153, filed Apr. 19, 2006, Donnelly et al.

(Continued)

*Primary Examiner* — James P Trammell
*Assistant Examiner* — Majdi Alsomiri
(74) *Attorney, Agent, or Firm* — McCracken & Frank LLC

(57) ABSTRACT

A marine power system comprises a motor for providing propulsion. It also comprises an energy storage unit (ESU) for storing and supplying energy to the motor. A prime power system is connected to the ESU and motor for selectively providing energy to these subsystems through a bus. The motor selectively receives energy from the prime power system and the ESU and can supply regenerative braking energy to the bus. The system can also accommodate multiple generator sets providing system power. The ESU can also provide starting power for the prime power system. Alternately, the prime power system drives a mechanical power system output shaft connected to the motor, and the marine system comprises an alternator driven by the prime power system output shaft. The ESU can transmit energy to the alternator. The prime power system can be located on a tugboat displacing a barge carrying the energy storage unit.

22 Claims, 12 Drawing Sheets

U.S. PATENT DOCUMENTS

| | | | |
|---|---|---|---|
| 6,155,212 A * | 12/2000 | McAlister | 123/3 |
| 6,170,587 B1 * | 1/2001 | Bullock | 180/69.6 |
| 6,223,712 B1 * | 5/2001 | Montgomery | 123/195 R |
| 6,279,550 B1 * | 8/2001 | Bryant | 123/559.1 |
| 6,334,300 B1 * | 1/2002 | Mehail | 60/39.6 |
| 6,418,708 B1 * | 7/2002 | Mehail | 60/39.6 |
| 6,490,854 B2 * | 12/2002 | Mehail | 60/39.6 |
| 6,587,765 B1 * | 7/2003 | Graham et al. | 701/21 |
| 6,651,433 B1 * | 11/2003 | George, Jr. | 60/618 |
| 6,699,081 B1 * | 3/2004 | Divljakovic et al. | 440/1 |
| 6,718,751 B2 * | 4/2004 | Mehail | 60/39.6 |
| 6,857,918 B1 * | 2/2005 | Lebreux et al. | 440/6 |
| 6,965,817 B2 * | 11/2005 | Graham et al. | 701/21 |
| 6,988,358 B2 * | 1/2006 | Mehail | 60/39.6 |
| 7,142,955 B1 * | 11/2006 | Kern et al. | 701/21 |
| 7,190,133 B2 * | 3/2007 | King et al. | 318/375 |
| 7,201,244 B2 * | 4/2007 | Johnston et al. | 1/1 |
| 7,222,614 B2 * | 5/2007 | Bryant | 123/559.1 |
| 7,241,192 B2 * | 7/2007 | Andersen et al. | 440/1 |
| 7,281,527 B1 * | 10/2007 | Bryant | 123/564 |
| 7,304,445 B2 | 12/2007 | Donnelly | |
| 7,309,929 B2 | 12/2007 | Donnelly et al. | |
| 7,330,782 B2 * | 2/2008 | Graham et al. | 701/21 |
| 7,406,829 B2 * | 8/2008 | Coffinberry | 60/801 |
| 7,482,767 B2 * | 1/2009 | Tether | 318/139 |
| 7,518,254 B2 * | 4/2009 | Donnelly et al. | 290/40 C |
| 7,667,347 B2 * | 2/2010 | Donnelly et al. | 307/10.1 |
| 2002/0029556 A1 * | 3/2002 | Mehail | 60/39.6 |
| 2002/0112464 A1 * | 8/2002 | Mehail | 60/39.6 |
| 2003/0061795 A1 * | 4/2003 | Mehail | 60/39.6 |
| 2004/0065308 A1 * | 4/2004 | Bryant | 123/562 |
| 2004/0102109 A1 * | 5/2004 | Cratty et al. | 440/113 |
| 2004/0163376 A1 * | 8/2004 | Mehail | 60/39.6 |
| 2005/0052080 A1 * | 3/2005 | Maslov et al. | 307/10.1 |
| 2005/0098162 A1 * | 5/2005 | Bryant | 123/559.1 |
| 2005/0115547 A1 * | 6/2005 | Bryant | 123/559.1 |
| 2005/0206331 A1 | 9/2005 | Donnelly | |
| 2006/0021606 A1 * | 2/2006 | Bryant | 123/562 |
| 2006/0076171 A1 | 4/2006 | Donnelly et al. | |
| 2006/0142915 A1 * | 6/2006 | Isono et al. | 701/36 |
| 2006/0175996 A1 * | 8/2006 | Tether | 318/376 |
| 2006/0266044 A1 | 11/2006 | Donnelly et al. | |
| 2006/0266255 A1 * | 11/2006 | Donnelly et al. | 105/61 |
| 2006/0266256 A1 | 11/2006 | Donnelly et al. | |
| 2008/0092860 A2 * | 4/2008 | Bryant | 123/562 |
| 2008/0296970 A1 * | 12/2008 | Donnelly et al. | 307/9.1 |
| 2008/0315583 A1 * | 12/2008 | Beck et al. | 290/31 |

FOREIGN PATENT DOCUMENTS

| | | |
|---|---|---|
| WO | WO97/40999 | 11/1997 |
| WO | WO 2005007444 A1 * | 1/2005 |
| WO | WO 2006020587 A2 * | 2/2006 |
| WO | WO 2006020667 A2 * | 2/2006 |
| WO | WO2007/068514 | 6/2007 |

OTHER PUBLICATIONS

U.S. Appl. No. 60/814,595, filed Jun. 15, 2006, Donnelly.

* cited by examiner

MARINE POWER TRAIN SYSTEM AND METHOD OF STORING ENERGY IN A MARINE VEHICLE

The present application claims priority of U.S. Provisional patent application No. 60/862,728 filed Oct. 24, 2006, the contents of which are incorporated herein by reference.

FIELD OF THE INVENTION

The present invention generally relates to an electrical architecture for designing and operating a versatile marine power system utilizing a plurality of engine, fuel, energy storage and drive combinations. More particularly, the invention related to a marine power train system and a method of storing energy in a marine vehicle.

BACKGROUND OF THE INVENTION

Most older tug boats and other small marine vessels such as yachts utilize a single inboard engine with a mechanical drive train to operate a single screw. More modern tug boats now more commonly have a single in-board engine with a mechanical drive train to operate twin screws.

A so-called hybrid tug has a single engine but utilizes an electrical transmission to drive twin screws. An electrical transmission takes rectified ("DC") electrical output from an alternator and drives a DC or AC motor which turns a screw. This is directly analogous to a well-known diesel-electric locomotive power train. In one configuration, two different size engines can be used with an electrical transmission. The larger can be used, for example, when more power or higher speeds are required and the smaller engine can be used, for example, when less power and longer range are required.

The Terra Nova Marine Company has developed a commercially viable diesel-electric propulsion system for medium-sized fishing vessels utilizing multiple engines. Electric motors replace the main diesel propulsion engine so that the power production can be split to several smaller diesel generators. Electric motors are highly efficient over a range of operational speed and power output, while a diesel engine has a clear peak in efficiency. They estimate that the diesel-electric configuration will reduce emissions compared to a similar vessel with a conventional propulsion system.

A jet drive is commonly used on some small marine craft. The jet drive is comprised of an engine-driven water pump that sucks in water through the bottom of the boat and shoots it out through a nozzle at the stern. Steering the boat is done by changing the direction of the discharge nozzle. A few of the advantages in using a jet drive system are (1) a complete absence of all underwater appendages—no rudder, no propeller, no strut, and no shaft; (2) jet boats are safer around people in the water because of the lack of all underwater appendages, especially the propeller; and (3) because the system is so simple, there is less likelihood of failure. Among the disadvantages of jet drives are that they are still not as efficient as other systems and debris in the water (weeds, trash, etc.) can be sucked into the pump and cause the propulsion system to shut down.

Known to the applicant is WO1997/040999 which discloses a method and apparatus for propelling a sail-powered marine vessel using different power sources and power supplies.

There is an unmet need for a small marine craft drive architecture that can utilize multiple engines, energy storage and use jet drive technology for added maneuverability and regenerative braking.

SUMMARY OF THE INVENTION

In accordance with the present invention, there is provided a marine power system comprising:

i) at least one motor for driving a propulsion unit having a propulsion unit average power and a propulsion unit peak power;

ii) at least one energy storage unit for storing electric energy and supplying said electric energy to the at least one motor, having an energy storage capacity and an energy storage unit output power;

iii) at least one prime power system having a prime power system rated power, being electrically connected to the at least one energy storage unit and the at least one motor for selectively providing electrical energy to the at least one energy storage unit and to the at least one motor;

iv) a bus electrically connecting the at least one energy storage unit, the at least one prime power system and the at least one motor; and v) a control system for controlling the operation of the at least one prime power system and the propulsion unit, and for monitoring the at least one energy storage unit, wherein the at least one motor selectively receives operational energy from the at least one energy storage unit and the at least one prime power system, the at least one motor supplies regenerative braking energy to the bus when the propulsion unit collects energy from water passing by the propulsion unit, and wherein the ratio of the at least one prime power system rated power to the propulsion unit peak power is between 0.1 and 0.8.

According to the present invention, there is also provided a marine power system comprising:

i) at least one motor for driving a propulsion unit having a propulsion unit average power and a propulsion unit peak power;

ii) at least one prime power system driving a mechanical power system output shaft connected to the at least one motor through a mechanical transmission;

iii) at least one alternator driven by the at least one prime power system output shaft;

iv) at least one energy storage unit for storing electric energy and being connected to the at least one alternator, having an energy storage capacity and an energy storage unit output power;

v) a bus electrically connecting the at least one energy storage unit, and the at least one alternator; and vi) a control system for controlling the operation of the at least one prime power system and the propulsion unit, and for monitoring the at least one energy storage unit, wherein the at least one energy storage system provides starting power for the at least one prime power system, and wherein the ratio of the at least one prime power system rated power to the propulsion unit peak power is between 0.5 and 1.0.

According to the present invention, there is also provided a method of storing energy in a marine vehicle comprising the steps of:

a) providing a marine power system comprising:

i) at least one motor for driving a propulsion unit having a propulsion unit average power and a propulsion unit peak power;

ii) at least one energy storage unit for storing electric energy and supplying said electric energy to said at least one motor, having an energy storage capacity and an energy storage unit output power;

iii) at least one prime power system having a prime power system rated power, being electrically connected to the at least one energy storage unit and the at least one motor for selectively providing electrical energy to the at least one energy storage unit and to the at least one motor;

iv) a bus electrically connecting the at least one energy storage unit, the at least one prime power system and the at least one motor; and v) a control system for controlling the operation of the at least one prime power system and the propulsion unit, and for monitoring the at least one energy storage unit, b) selectively providing to the at least one motor operational energy from the at least one energy storage unit and the at least one prime power system; and c) supplying regenerative braking energy from the at least one motor to the electrical bus when the propulsion unit collects energy from water passing by the propulsion unit, the ratio of the at least one prime power system rated power to the propulsion unit peak power being between 0.1 and 0.8.

These and other needs are addressed by the various embodiments and configurations of the present invention which are directed generally to design and control of individual prime power systems of a multi-prime power source marine propulsion system.

The inventions disclosed herein are applicable to marine craft such as tugboats, fishing boats, barges, yachts and other small to medium size marine craft that can utilize multiple prime power sources such as diesel engines, gas turbine engines, fuel cells, other types of internal combustion engines or combinations of these along with an energy storage units. The inventions disclosed herein are also applicable to such marine craft utilizing multiple prime power sources, energy storage units and water jet propulsion systems.

In one embodiment, a number of small engines are used in conjunction with an electric transmission to operate one or more motors that directly turn one or more screws. In this embodiment, the engines can be placed so as to optimize ballast requirements and allow ready servicing and replacement of engines. The engines may be of similar types and sizes or dissimilar types and dissimilar sizes. For example, the engines may be diesel engines, gas turbine engines, fuel cells, other types of internal combustion engines or combinations of these.

In a second embodiment, the power system may be comprised of one or more engines and an energy storage system. The energy storage system can be charged by one or more of the engines. The energy storage system may be used to provide all the power for propulsion such as for example when moving about a marina or small harbor. The energy storage system may also be used to provide auxiliary power when all the engines are on or off. The energy storage system may also be used to provide an additional power boost when one or all of the engines are operating. The energy storage system may be a battery pack, a capacitor bank, a flywheel system or a combination of these.

In a third embodiment, the power system may be comprised of one or more engines, an energy storage system and a jet propulsion drive. The jet drive may be used to augment propulsion or to provide additional mobility when used as side thrusters. If the jet drive pump is operated as a turbine and the jet drive motor is operated as a generator, the system may also be used to provide dynamic or regenerative braking for the craft. In braking mode, incoming water is used to operate a turbine which in turn operates a generator. Kinetic energy is removed from the water and the water pressure on the upstream side of the turbine is greater than the water pressure on the downstream side, thereby providing a braking force to the craft. The energy generated by this system can be dissipated in a resistive grid (dynamic braking) or used to charge an energy storage system (regenerative braking).

The above embodiments allow a number of additional techniques to be applied. For example, the present invention can utilize a means of boosting the voltage output of an alternator utilizing the armature coils of the alternator as part of the boost circuit. This invention can enable refined control strategies for operating a plurality of engine systems during propulsion, idling and braking and is applicable to marine craft utilizing diesel engines, gas turbine engines, other types of internal combustion engines, fuel cells or combinations of these that require substantial power and low emissions utilizing multiple power plant combinations.

As another example, the present invention can utilize a number of control strategies for operating a plurality of prime power sources during propulsion, idling and braking and is applicable to marine propulsion systems utilizing diesel engines, gas turbine engines, other types of internal combustion engines, fuel cells or combinations of these that require substantial power and low emissions utilizing multiple power plant combinations. The present invention is directed at a general control strategy for multi-power plant systems where the power systems need not be of the same type or power rating and may even use different fuels. The invention is based on a common DC bus electrical architecture so that prime power sources need not be synchronized.

As another example, the present invention can utilize a means of starting or restarting an engine on a marine craft having at least one of another engine, a fuel cell system and an energy storage system. The method is applicable to propulsion systems utilizing diesel engines, gas turbine engines, other types of internal combustion engines, fuel cells or combinations of these that require substantial power and low emissions utilizing multiple power plant combinations.

The present invention is directed, in part, at a flexible control strategy for a multi-engine systems based on a common DC bus electrical architecture so that prime power sources need not be synchronized.

Another benefit of this invention is the capacity to recharge the energy storage system by an electrical power line. This power line can be fed by a power source on shore or on another vessel.

Another aspect of the present invention involves energy and power transfer amongst different crafts such as might be advantageous to a hybrid tugboat pushing or pulling a hybrid barge or string of barges.

It is understood that a reference to specific marine craft such as tugboats, fishing boats, barges, yachts and other small to medium size marine craft applies to all these types of small to medium size marine craft unless otherwise stated.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

The following definitions are used herein:

A hybrid vehicle combines an energy storage system, a prime power unit, and a vehicle propulsion system. A parallel hybrid vehicle is configured so that propulsive power can be provided by the prime power source only, the energy storage source only, or both. In a series hybrid vehicle, propulsive power is provided by the energy storage unit only and the prime power source is used to supply energy to the energy storage unit.

When the energy storage capacity is small and the prime power source is large, the hybrid may be referred to as a power-assist hybrid. For example, an electric drive may be used primarily for starting and power assist while an internal combustion engine used primarily for propulsion. These vehicles are typically parallel hybrids.

In a dual-mode hybrid, the energy storage and prime power are approximately balanced. For example, a dual-mode hybrid can operate on electric drive only, on engine power only, or on a combination of both. These vehicles are typically parallel hybrids.

A range-extended hybrid has a large energy storage capacity and a small prime power source. An example would be an electric drive vehicle with a small engine used for charging an electrical energy storage unit. These vehicles are typically series hybrids.

An engine refers to any device that uses energy to develop mechanical power, such as motion in some other machine. Examples are diesel engines, gas turbine engines, microturbines, Stirling engines and spark ignition engines.

A prime power source refers to any device that uses energy to develop mechanical or electrical power, such as motion in some other machine. Examples are diesel engines, gas turbine engines, micro-turbines, Stirling engines, spark ignition engines or fuel cells.

A motor refers to a device that produces or imparts motion.

A traction motor is a motor used primarily for propulsion such as commonly used in a locomotive. Examples are an AC or DC induction motor, a permanent magnet motor and a switched reluctance motor.

An energy storage system refers to any apparatus that acquires, stores and distributes mechanical or electrical energy which is produced from another energy source such as a prime energy source, a regenerative braking system, a third rail and a catenary and any external source of electrical energy. Examples are a battery pack, a bank of capacitors, a compressed air storage system, a hydraulic accumulator and a bank of flywheels.

An electrical energy converter refers to an apparatus that transmits or blocks the flow of electrical energy and may also increase or reduce voltage and change the frequency of the transmitted energy including changing the frequency to zero. Examples are but are not limited to an inverter, a rectifier circuit, a chopper circuit, a controlled rectifier such as a cycle converter, a boost circuit, a buck circuit and a buck/boost circuit.

A mechanical-to-electrical energy conversion device refers an apparatus that converts mechanical energy to electrical energy. Examples include but are not limited to a synchronous alternator such as a wound rotor alternator or a permanent magnet machine, an asynchronous alternator such as an induction alternator, a DC generator, and a switched reluctance generator.

Dynamic braking is implemented when the electric propulsion motors are switched to generator mode during braking to augment the braking force. The electrical energy generated is typically dissipated in a resistance grid system.

Regenerative braking is the same as dynamic braking except the electrical energy generated is recaptured and stored in an energy storage system for future use.

Engine speed is the rotary speed of the engine output drive shaft and is typically expressed in rpms.

Alternator speed is the rotary speed of the alternator rotor and is typically expressed in rpms. The alternator speed is commonly the same as engine speed since they are usually directly connected with no intermediate gearing.

An IGBT is Insulated Gate Bipolar Transistor which is a power switching device capable of sequentially chopping a voltage waveform at a very fast rate.

The duty cycle of an IGBT is the ratio of time that the IGBT is switched on (conducting) to the total time that the IGBT is switched on (conducting) and off (non-conducting).

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

BRIEF DESCRIPTION OF THE DRAWINGS

These and other objects and advantages of the invention will become apparent upon reading the detailed description and upon referring to the drawings in which.

DETAILED DESCRIPTION OF PREFERRED EMBODIMENTS

Figure 1:
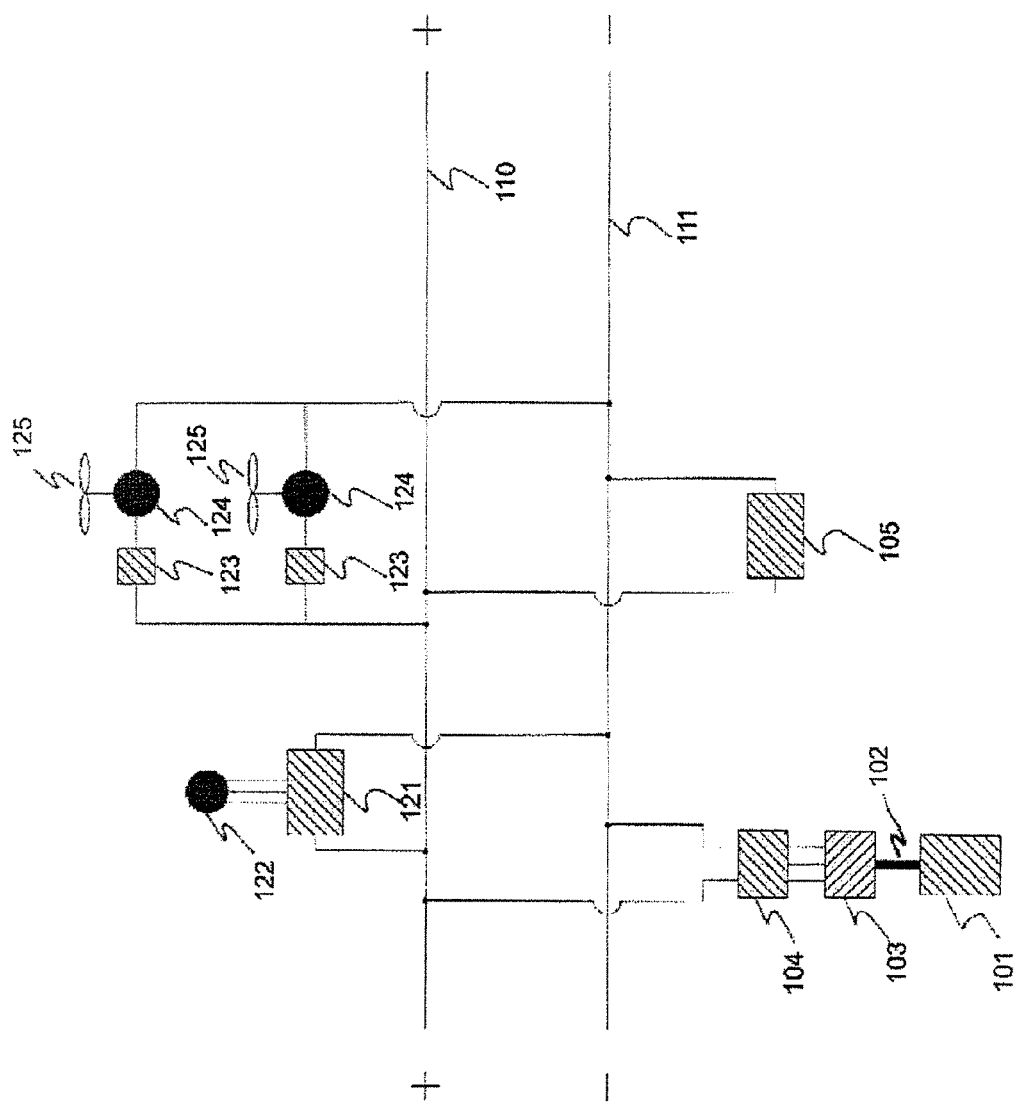
FIG. 1 is a schematic block diagram of a propulsion system for a hybrid marine craft.

Referring to FIG. 1, according to the present invention, there is provided a marine power system comprising:

i) at least one motor 124 for driving a propulsion unit 125 having a propulsion unit average power and a propulsion unit peak power;

ii) at least one energy storage unit 105 for storing electric energy and supplying said electric energy to the at least one motor 124, having an energy storage capacity and an energy storage unit output power;

iii) at least one prime power system 101 having a prime power system rated power, being electrically connected to the at least one energy storage unit 105 and the at least one motor 124 for selectively providing electrical energy to the at least one energy storage unit 105 and to the at least one motor 124;

iv) a bus 110 electrically connecting the at least one energy storage unit 105, the at least one prime power system 101 and the at least one motor 124; and v) a control system for controlling the operation of the at least one prime power system 101 and the propulsion unit 125, and for monitoring the at least one energy storage unit 105, wherein the at least one motor 124 selectively receives operational energy from the at least one energy storage unit 105 and the at least one prime power system 101, the at least one motor 124 supplies regenerative braking energy to the bus 110 when the propulsion unit 125 collects energy from water passing by the propulsion unit 125, and wherein the ratio of the at least one prime power system rated power to the propulsion unit peak power is between 0.1 and 0.8.

For example, in the case of a 5000 hp hybrid marine power system in series, up to 10 500 hp generators may be required to use Tier 3 or Tier 4 optimized off-road engines. In another case, a 4000 hp generator may be used in conjunction with a 1000 hp energy storage system.

Preferably, the marine power system further comprises an alternator driven by the at least one prime power system, the alternator being electrically connected to the bus, wherein the at least one energy storage system provides starting power for the at least one prime power system.

Preferably, the marine power system further comprises a plurality of electrical energy converters operable to convert energy to electrical energy having a desired electrical characteristic, the plurality of electrical energy converters comprising first and second electrical energy converters having respectively first and second output voltages and first and second output currents, the plurality of electrical energy converters being electrically connected to the bus. A plurality of prime power systems provide energy to the plurality of electrical energy converters, the plurality of prime power systems comprising first and second engines corresponding respectively to the first and second electrical energy converters. The bus is operable to transport electrical energy from the electrical energy converters to the at least one motor. At a selected time, the relationship between at least one of a current level and a voltage level of the bus on the one hand and at least one of the first and second output currents and the first and second output voltages of the first and second electrical energy converters on the other hand determines, at the selected time, which of the first and second engines supplies energy to the bus through the corresponding electrical energy converter.

Preferably, the at least one prime power system comprises a prime power source selected from the group consisting of engines, diesel engines, gas turbine engines, microturbines, Stirling engines, spark ignition engines, fuel cells, solar cells, grid power, power induction systems, wind turbines and a combination thereof.

Preferably, the energy storage unit comprises an energy storage system selected from the group consisting of a battery pack, a bank of capacitors, a compressed air storage system, a hydraulic accumulator, one or more flywheels and a combination thereof.

Preferably, the energy storage unit forms part of a ballast in a marine vehicle.

Preferably, the system further comprises a power-dissipating load for dissipating excess regenerative braking energy on the electrical bus, and the power-dissipating load is mounted on a marine vehicle under water.

Preferably, the system further comprises an auxiliary power system connected to the electrical bus.

Preferably, the control system comprises a controller selected from the group consisting of analog devices, programmable logic controllers and computers.

Preferably, the at least one energy storage unit and the at least one prime power system are sized and provided in a form adapted to retrofit with an existing receiving means on a marine vehicle for receiving a diesel engine and a generator set.

Preferably, the at least one energy storage unit provides power regulation to the at least one prime power system.

Preferably, the propulsion unit comprises a drive system selected from the group consisting of screws, propellers, and jet pumps.

Preferably, the at least one prime power system and the at least one energy storage system each comprise:
 a generator operable to convert mechanical energy output by the at least one prime power system into electrical energy; and
 an electrical converter operable to convert the outputted generator electrical energy into direct current electrical energy and to permit electrical energy to flow reversibly in each of two directions.

At a selected time, the at least one prime power system is turned off and the at least one energy storage system is turned on. The electrical converter of the at least one energy storage system is switched to provide electrical energy to the bus at a selected voltage level. The electrical converter of the at least one prime power system is switched to receive electrical energy from the bus at the selected voltage level. The at least one prime power system is activated using electrical energy supplied, via the bus, by the at least one energy storage system.

Preferably, the at least one prime power system is located on a first vessel and the at least one energy storage system is located on a second vessel being displaced or towed by the first vessel.

Preferably, the first vessel is a tugboat and the second vessel is a barge.

According to the present invention, there is also provide a marine power system comprising:
 i) at least one motor for driving a propulsion unit having a propulsion unit average power and a propulsion unit peak power;
 ii) at least one prime power system driving a mechanical power system output shaft connected to the at least one motor through a mechanical transmission;
 iii) at least one alternator driven by the at least one prime power system output shaft;
 iv) at least one energy storage unit for storing electric energy and being connected to the at least one alternator, having an energy storage capacity and an energy storage unit output power;
 v) a bus electrically connecting the at least one energy storage unit, and the at least one alternator; and
 vi) a control system for controlling the operation of the at least one prime power system and the propulsion unit, and for monitoring the at least one energy storage unit,
wherein the at least one energy storage system provides starting power for the at least one prime power system, and wherein the ratio of the at least one prime power system rated power to the propulsion unit peak power is between 0.5 and 1.0.

For example, in the case of a 4000 hp hybrid marine parallel power system, a 2000 hp motor may be used with a 2000 hp energy storage subsystem or an auxiliary multi-generator set. In another case, the motor must provide the complete 4000 hp with the energy storage system or auxiliary multi-generator set only operating when the system is in standby mode.

Preferably, the marine power system of claim further comprises a supplementary regenerative braking power source electrically connected to the bus. The supplementary regenerative power source supplies further regenerative braking energy to the bus.

Preferably, the supplementary regenerative braking power source is selected from the group consisting a winch system and a crane system.

According to the present invention, there is also provide a method of storing energy in a marine vehicle comprising the steps of:

a) providing a marine power system comprising:

i) at least one motor for driving a propulsion unit having a propulsion unit average power and a propulsion unit peak power;

ii) at least one energy storage unit for storing electric energy and supplying said electric energy to said at least one motor, having an energy storage capacity and an energy storage unit output power;

iii) at least one prime power system having a prime power system rated power, being electrically connected to the at least one energy storage unit and the at least one motor for selectively providing electrical energy to the at least one energy storage unit and to the at least one motor;

iv) a bus electrically connecting the at least one energy storage unit, the at least one prime power system and the at least one motor; and v) a control system for controlling the operation of the at least one prime power system and the propulsion unit, and for monitoring the at least one energy storage unit, b) selectively providing to the at least one motor operational energy from the at least one energy storage unit and the at least one prime power system; and c) supplying regenerative braking energy from the at least one motor to the electrical bus when the propulsion unit collects energy from water passing by the propulsion unit, the ratio of the at least one prime power system rated power to the propulsion unit peak power being between 0.1 and 0.8.

The marine power system may also use systems or power architectures described in the following references, the contents of which are incorporated herein by reference: "Alternator Boost Method", filed Apr. 25, 2006 with U.S. Ser. No. 11/411,987, "Locomotive Power Train Architecture", filed Aug. 19, 2005 with U.S. Ser. No. 11/200,881, "Hybrid Locomotive Configuration", filed Mar. 8, 2005 with U.S. Ser. No. 11/075,550, "Multiple Prime Power Source Locomotive Control", filed Apr. 25, 2006 with U.S. Ser. No. 11/412,071, "Locomotive Engine Start Method", filed Apr. 25, 2006 with U.S. Ser. No. 11/411,986, and "Multi-Power Source Locomotive Control Modes", filed Jun. 15, 2006 with U.S. Ser. No. 60/814,595.

FIG. 1 is a schematic block diagram of a propulsion system for a hybrid marine craft comprised of a single engine 101 and an energy storage unit 105 connected in parallel to a direct current ("DC") bus represented by a positive bus bar 110 and a negative bus bar 111. The engine is the prime power source in the propulsion system. Examples are diesel engines, gas turbine engines, micro-turbines, Stirling engines, spark ignition engines or fuel cells. The mechanical shaft 102 of engine 101 drives an alternator 103 whose alternating current ("AC") output is rectified by rectifier circuit 104 which is in turn connected to the DC bus. The alternator/rectifier combination can be formed from, for example, a synchronous alternator such as a wound rotor alternator or a permanent magnet machine, an asynchronous alternator such as an induction alternator, a DC generator, and a switched reluctance generator. An auxiliary power supply 122 for the craft is shown connected to the DC bus by a voltage reduction apparatus 121 which may be, for example, a voltage buck circuit. In this example, two propulsion units each turning its own screw (propeller) 125 are shown. Propulsion motors 124 are shown connected in parallel to the DC bus, each via an electrical energy converter 123 which is an inverter when propulsion motor 124 is an AC motor and a chopper circuit when propulsion motor 124 is a DC motor.

Figure 2:
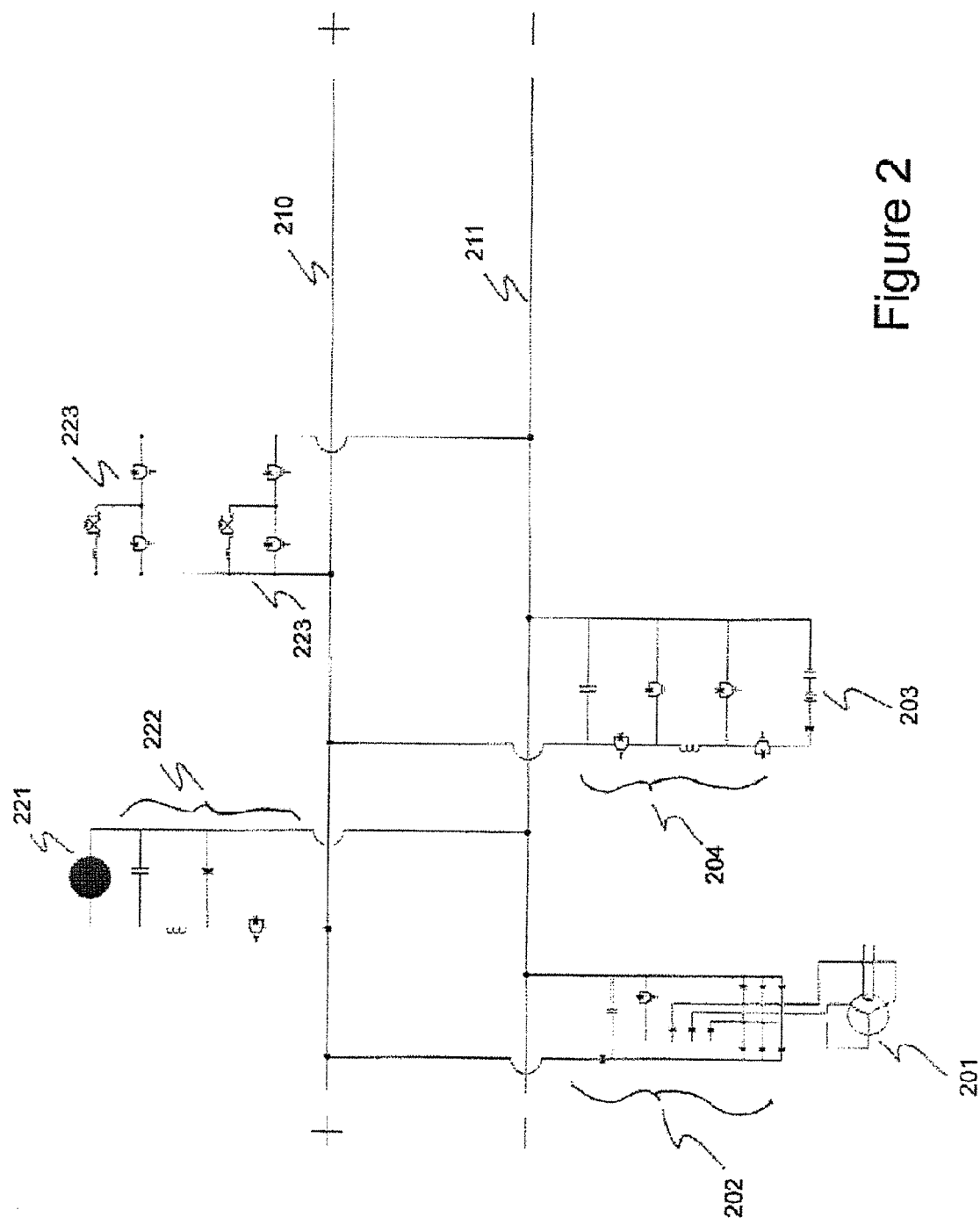
FIG. 2 is a schematic circuit diagram of a propulsion system for a hybrid marine craft.

FIG. 2 is a schematic circuit diagram of a propulsion system for a hybrid marine craft with an engine represented by alternator 201. Engine 201 is shown with voltage boost alternator/rectifiers 202 such as described in "Alternator Boost Method", Donnelly and Tarnow, filed Apr. 25, 2006 with U.S. Ser. No. 11/411,987. The alternator 201 is taken to be a 3-phase alternator and the engine output shaft is taken to be directly connected to the rotor of the alternator (so engine rpms and alternator rpms are the same in the examples discussed herein). As can be appreciated, the alternator can be a 2-phase or n-phase machine but is typically a 3-phase machine when used with large diesel engines such as used on marine craft, for example. As can also be appreciated, the engine output shaft can be geared up or down to couple with the alternator rotor. However, in most diesel-electric locomotives, the engine output shaft is directly connected to the rotor of the alternator. When the engine is operating at high rpm, there is no need to boost the output voltage of the alternator/rectifier. However, when the engine is operating at low rpm, the exciter circuit cannot sufficiently compensate to provide the required level of output voltage. At low rpm, for example at 1,000 rpm (where the preferred operating rpm level of the alternator is in the range of about 1,700 to about 1,900 rpm), the output frequency of each armature coil is about 33 Hz. A power IGBT can operate at on/off frequencies of about 1,000 Hz and so can provide the requisite pumping action to boost the output voltage of each armature coil. That is, the inductance of the alternator armature coils is in the correct range for effective voltage boost for the range of alternator operating frequencies and the available IGBT switching duty cycles. A battery pack 203 is shown connected in parallel to a DC bus represented by a positive bus bar 210 and a negative bus bar 211 via a buck/boost circuit 204. The buck/boost circuit can be used to control the voltage level supplied to the DC bus. This is an optional feature but could be used, for example, to boost the voltage of a battery pack when the state-of-charge ("SOC") is low. An auxiliary power supply system 221 is shown connected to the DC bus by a voltage buck circuit. Typically, the voltage on the DC bus is in the approximately 400 to 800 volt range and this level must be reduced for most common marine auxiliary power systems. Two propulsion motor systems 223 are shown attached to the DC bus where the propulsion systems are shown here, for example, as series wound DC motors with field coil reversers and chopper controlled freewheeling circuits.

Figure 3:
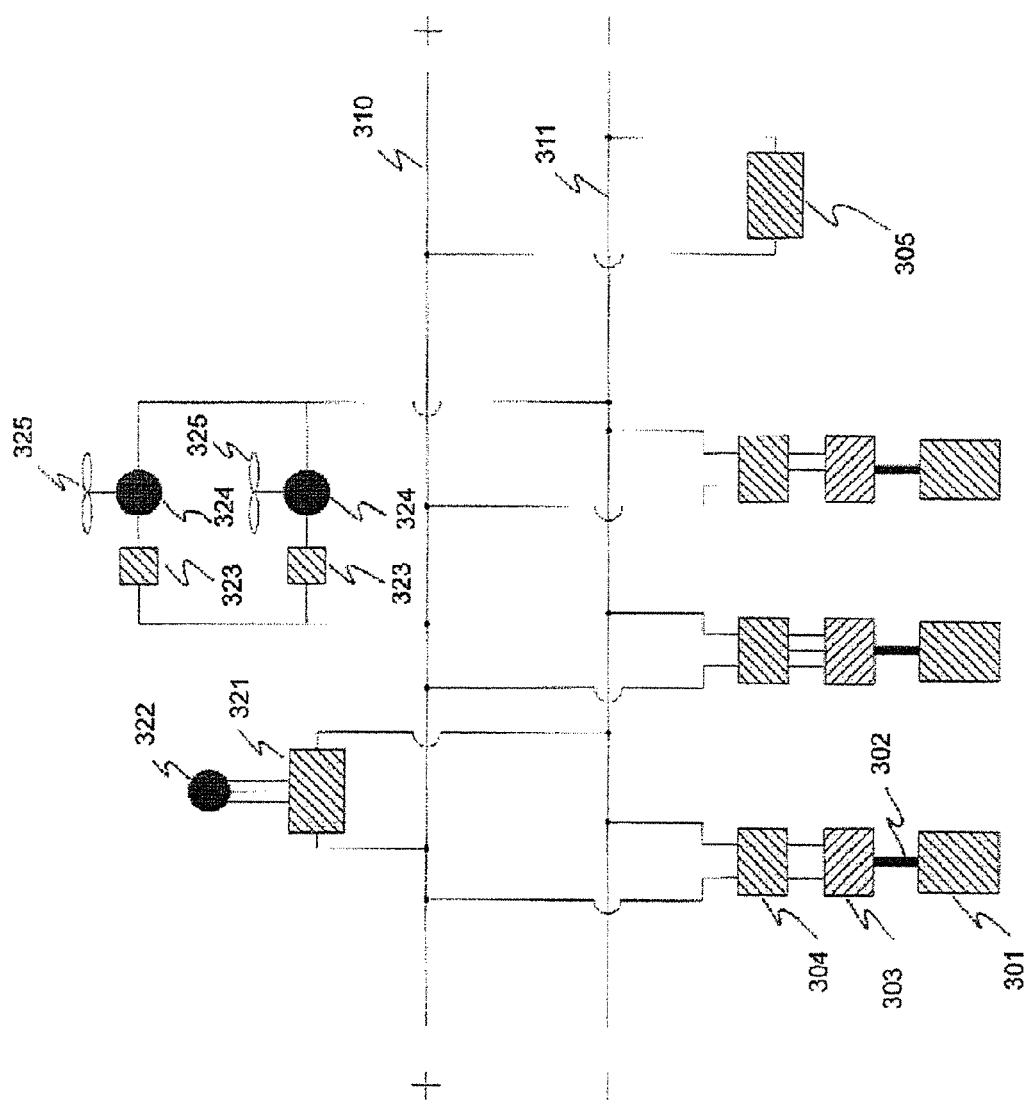
FIG. 3 is a schematic block diagram of a propulsion system for a multi-engine hybrid marine craft.

FIG. 3 is a schematic block diagram of a propulsion system for a multi-engine hybrid marine craft comprised of a three engines 301 and an energy storage unit 305 connected in parallel to a DC bus represented by a positive bus bar 310 and a negative bus bar 311. The engines are the prime power sources in the propulsion system. The mechanical shafts 302 of engines 301 drive alternators 303 whose AC output is rectified by rectifier circuits 304 which are in turn connected to the DC bus. An auxiliary power supply 322 for the craft is shown connected to the DC bus by a voltage reduction apparatus 321. In this example, two propulsion units each turning its own screw 325 are shown. Propulsion motors 324 are shown connected in parallel to the DC bus, each via an electrical energy converter 323 which is an inverter when propulsion motor 324 is an AC motor and a chopper circuit when propulsion motor 324 is an DC motor. An advantage of this configuration over that of the single engine hybrid shown in FIG. 1 is that the 3 engines can have the same total power as the single engine of the configuration shown in FIG. 1. This allows more efficient fuel management in many situations such as transition from high speed to low speed or, in the case of a tugboat, transition from high speed to low speed at high power. Another advantage of this configuration over that of the single engine hybrid is the ability to place the engines and energy storage unit so as to optimize the ballast distribution of the craft. Yet another advantage of this configuration over that of the single engine hybrid, is the greater ease of serviceability including removal and replacement of smaller engines over that of a single large engine.

Figure 4:
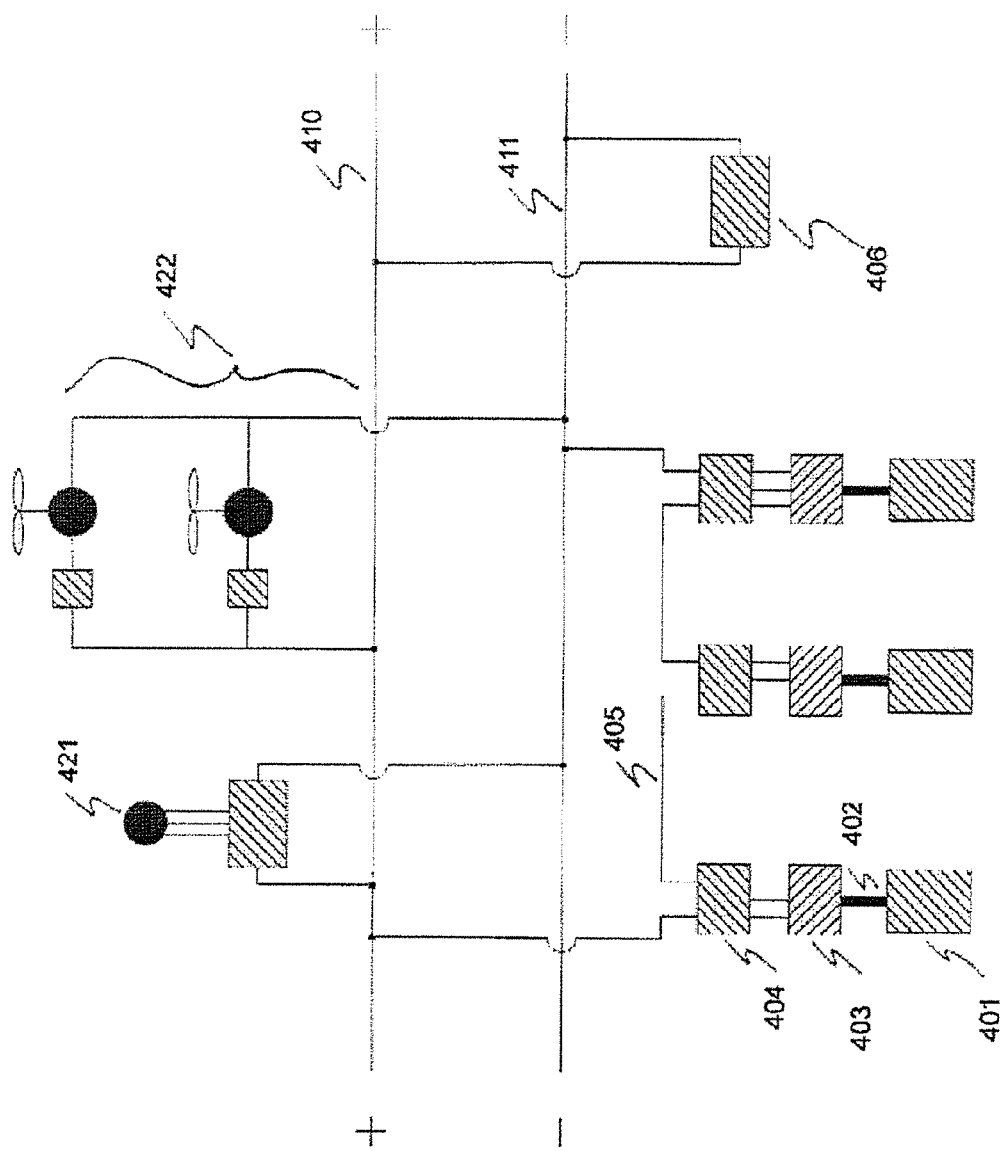
FIG. 4 is a schematic block diagram of an alternate propulsion system for a multiengine hybrid marine craft.

FIG. 4 is a schematic block diagram of an alternate propulsion system for a multiengine hybrid marine craft. In the configuration shown in FIG. 3, the 3 engine systems are shown connected in parallel to the DC bus (an engine system as used herein refers to the engine and its alternator/rectifier circuits). As can be appreciated, the engine systems need not be synchronized since they are providing DC power to the DC bus and each engine system has some range of independent voltage control. As shown in FIG. 4, the 3 engine systems are connected in series. Again, the engine systems need not be synchronized since they are providing DC power at their outputs. Each engine system can be operated at its own voltage output level although the current is common to all the engine systems. Otherwise the propulsion system is shown as being the same as that of FIGS. 1 and 3. This configuration is comprised of a three series connected engine systems and an energy storage unit 405 connected in parallel to a DC bus represented by a positive bus bar 310 and a negative bus bar 311. The mechanical shafts 402 of engines 401 drive alternators 403 whose AC output is rectified by rectifier circuits 404 which are in turn connected in series by connections 405 to the DC bus. An auxiliary power supply 421 for the craft is shown connected to the DC bus by a voltage reduction apparatus. In this example, two propulsion units 422 each turning its own screw are shown.

Figure 5:
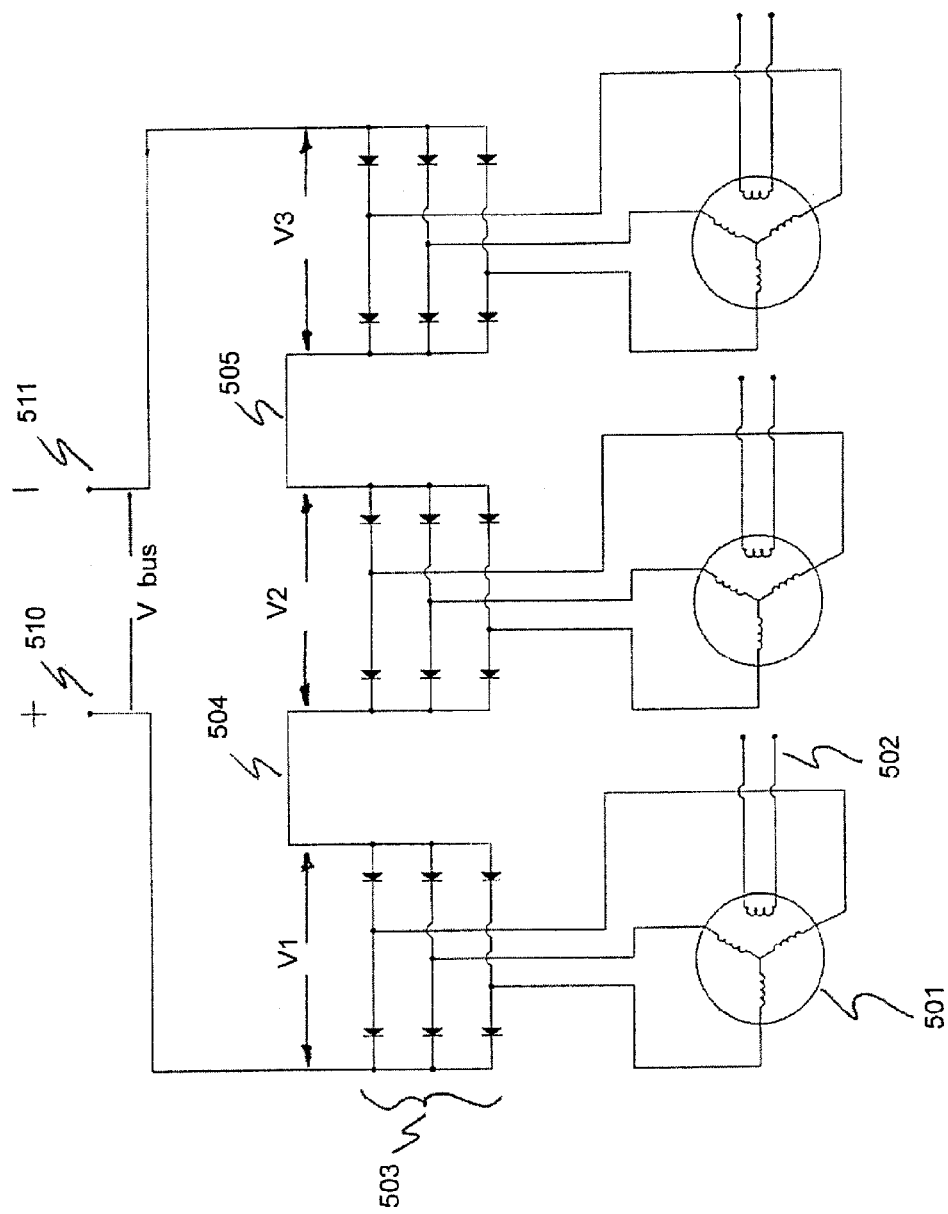
FIG. 5 is a schematic circuit diagram of an alternate propulsion system for a multiengine hybrid marine craft.

FIG. 5 is a schematic circuit diagram of the series connected engines in the alternate propulsion system of FIG. 4. Three-phase alternators 501 are shown along with their excitation coils 502. The AC outputs of each alternator 501 are connected to a rectifier circuit 503. The leftmost alternator/rectifier output is connected to the positive side 510 of the bus bar and to the middle alternator/rectifier by connection 504. The other output of the middle alternator/rectifier is connected to the rightmost alternator/rectifier by connection 505, by connection 504. Finally, the rightmost alternator/rectifier output is connected to the negative side 511 of the bus bar. The voltage V-bus applied to the DC bus is the sum of the individual alternator/rectifier outputs V1, V2 and V3. This series connected configuration of engines can be applied to other multi-engine vehicles such as for example multi-engine locomotives and multi-engine gantry cranes.

Figure 6:
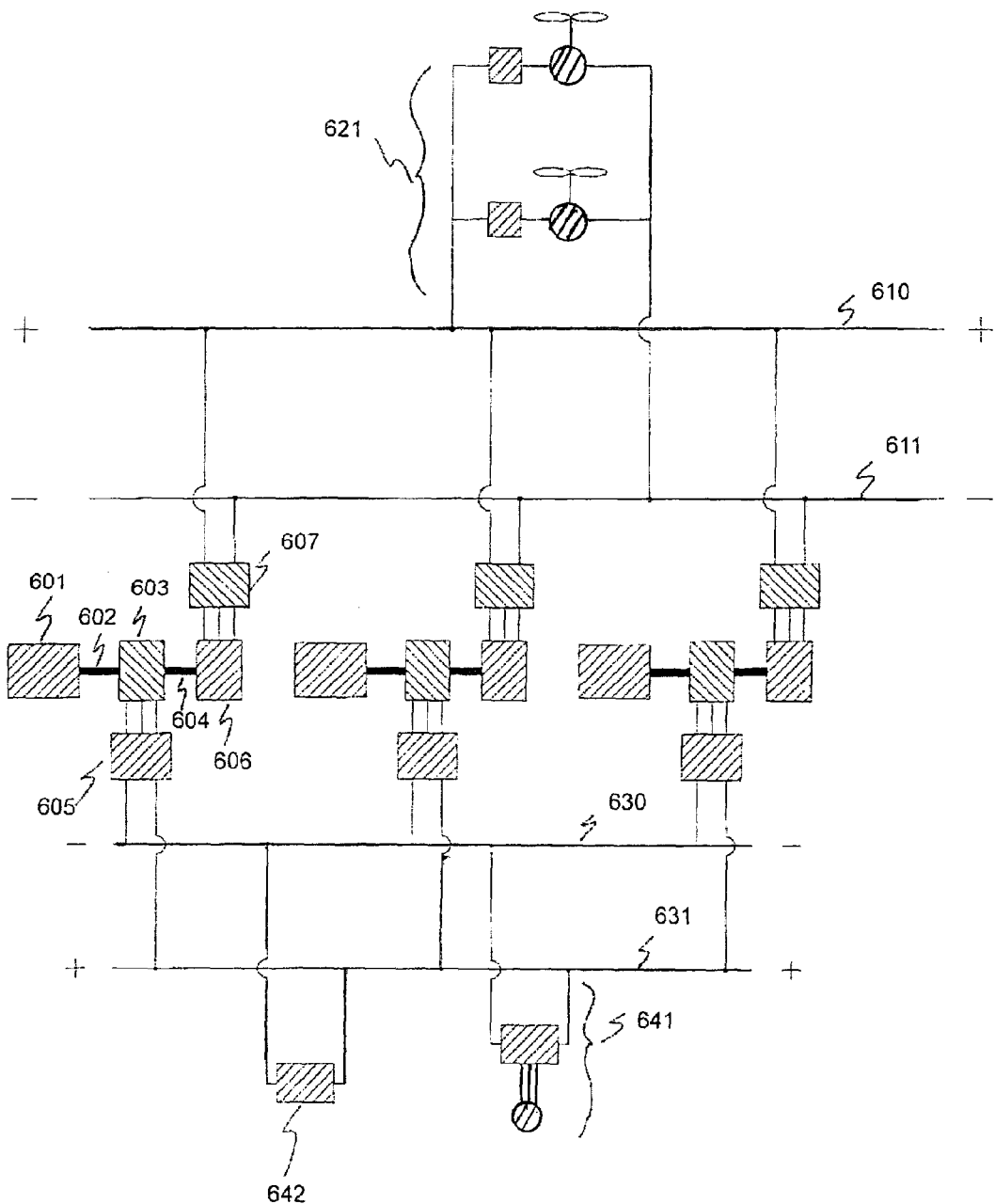
FIG. 6 is a schematic block diagram of a propulsion system for a multi-engine marine craft with a hybrid auxiliary power system.

FIG. 6 is a schematic block diagram of a propulsion system for a multi-engine marine craft with a hybrid auxiliary power system. In this configuration, three engines 601 are used. Each engine 601 drives a flywheel starter alternator which is comprised of typically a smaller alternator 603 which feeds power to an auxiliary power system DC bus and typically larger alternator 606 which feeds power to a main propulsion DC bus. Alternators 603 and 606 are driven by the output shaft of engine 601 shown as shafts 602 and 604. The main propulsion DC bus represented by bus bars 610 and 611 receives DC power from rectifier circuits 607 and are shown here driving a twin screw propulsion system 621, each of which is comprised of an electrical energy converter, a motor and a screw. The auxiliary power system DC bus represented by bus bars 630 and 631 receives DC power from rectifier circuits 605 and are shown here providing power to an energy storage system 642 and an auxiliary power system 641. As can be seen, the main propulsion DC bus can be operated at a different voltage and power level (typically higher) than the auxiliary power system DC bus (typically lower). The auxiliary power system DC bus system can be operated from the energy storage system alone such as for example when the craft is in harbor and requires lighting, heating or air-conditioning for example. The energy storage system can be recharged by plugging into a power source on shore, on another vessel or from the engines 601 when idling or providing power to the main propulsion DC bus.

A conventional battery operated starter motor can be used to start an engine. Alternately, the voltage control strategy articulated above is also compatible with the use of an induction alternator to provide electrical power from the engine or engines to a DC bus. The use of an induction alternator, when at least one electrical power source is in operation supplying power to the DC bus, would allow power from the DC bus to be used to start or restart an engine that is turned off. This method of starting engines is known and is used to provide high starting power without the need of a separate starter motor. A pre-lubrication pump can also be operated directly from the DC bus or from an auxiliary power supply to lubricate a diesel engine just prior to starting it so as to extend its operational lifetime. While the above engine start-up procedures are well-known, they can be applied more readily utilizing the voltage control and DC bus architecture of the present invention.

Figure 7:
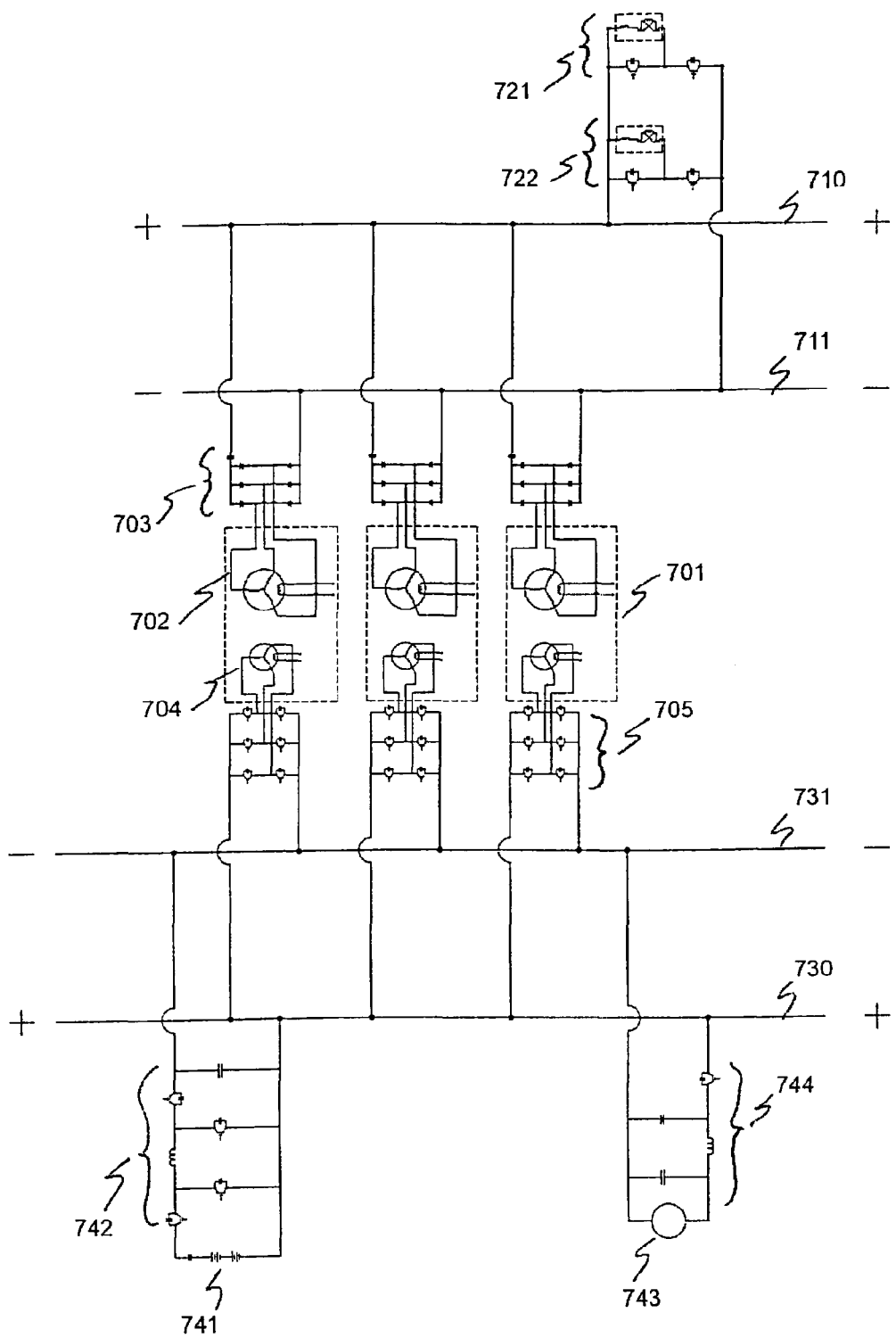
FIG. 7 is a schematic circuit diagram for a multi-engine hybrid marine craft with a hybrid auxiliary power system.

FIG. 7 is a schematic circuit diagram for a multi-engine hybrid marine craft with a hybrid auxiliary power system. In this configuration, three engines systems 701 are used. Each engine drives a flywheel starter alternator which is comprised of a typically smaller alternator 704 which feeds power to an auxiliary power system DC bus via an induction alternator and converter system 705; and a typically larger alternator 702 which feeds power to a main propulsion DC bus via diode rectifier system 703. The main propulsion DC bus represented by bus bars 710 and 711 receives DC power from rectifier circuits 703 and are shown here driving two twin screw propulsion systems 721 and 722, each of which shown here, for example, as series wound DC motors with field coil reversers and chopper controlled free wheeling circuits.

Engine systems 704 are shown with induction alternator and converter systems 705. The alternator and converter systems 705 allow energy and power to flow to or from the auxiliary power DC bus. The battery pack 741 may be used to provide power for starting one or more engines 704 by any of a number of well-known methods. As can be appreciated, the energy storage system 741 can also be a capacitor bank or a flywheel storage system. A similar electrical architecture for a multi-engine locomotive was disclosed previously in U.S. patent application Ser. No. 11/200,881 filed Aug. 19, 2005 entitled "Locomotive Power Train Architecture".

The auxiliary power system DC bus represented by bus bars 730 and 731 receives DC power from alternator and converter systems 705 and are shown here providing power to an energy storage system 741 and its optional voltage buck/boost circuit 742; and an auxiliary power system 743 and its optional voltage boost circuit 744. As can be seen, the main propulsion DC bus can be operated at a different voltage and power level (typically higher) than the auxiliary power system DC bus (typically lower). As described previously, the auxiliary power system DC bus system can be operated from the energy storage system alone.

Figure 8:
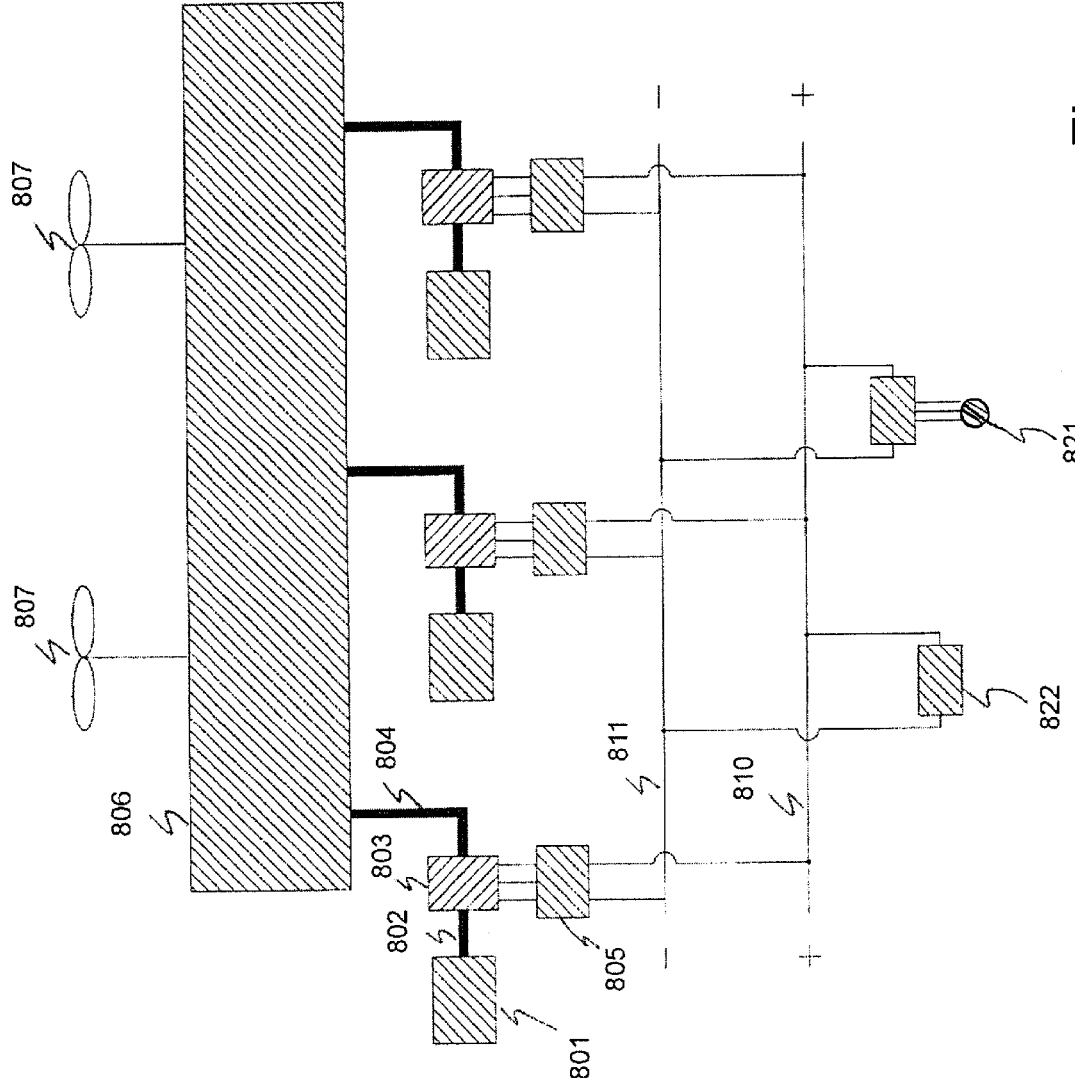
FIG. 8 is a schematic block diagram of an alternate propulsion system for a multiengine hybrid marine craft with a hybrid auxiliary power system.

FIG. 8 is a schematic block diagram of an alternate propulsion system for a multiengine hybrid marine craft with a hybrid auxiliary power system and is similar to the configuration shown in FIG. 6 except that the main propulsion system is driven by a mechanical transmission rather than by an electrical transmission. In this configuration, three engines 801 are used. Each engine 801 drives a flywheel starter alternator which is comprised of typically an alternator 805 driven by the engine output shaft 802 which feeds power to an auxiliary power system DC bus. Engine output shaft 804 is connected to a mechanical transmission 806 and is shown here driving a twin screw 807 propulsion system.

The transmission 806 may be a synchronous transmission which would require the engines 801 to be operated synchronously or the transmission 806 may be comprised of differential elements which would allow the engines 801 to be operated asynchronously. The auxiliary power system DC bus represented by bus bars 810 and 811 receives DC power from alternator and converter systems 805 and are shown here providing power to an energy storage system 822 and an auxiliary power system 821. The auxiliary power system DC bus system can be operated from the energy storage system alone such as for example when the craft is in harbor and requires lighting, heating or air-conditioning for example. The energy storage system can be recharged by plugging into a power source on shore, on another vessel or from the engines 801 when idling or providing power to the main propulsion system.

Engine systems 801 are shown with induction alternator and converter systems 805. The alternator and converter systems 805 allow energy and power to flow to or from the auxiliary power DC bus. The energy storage system 822 may be used to provide power for starting one or more engines 801 by any of a number of well-known methods. As can be appreciated, the energy storage system 822 can be a battery pack, capacitor bank or a flywheel energy storage system.

Figure 9:
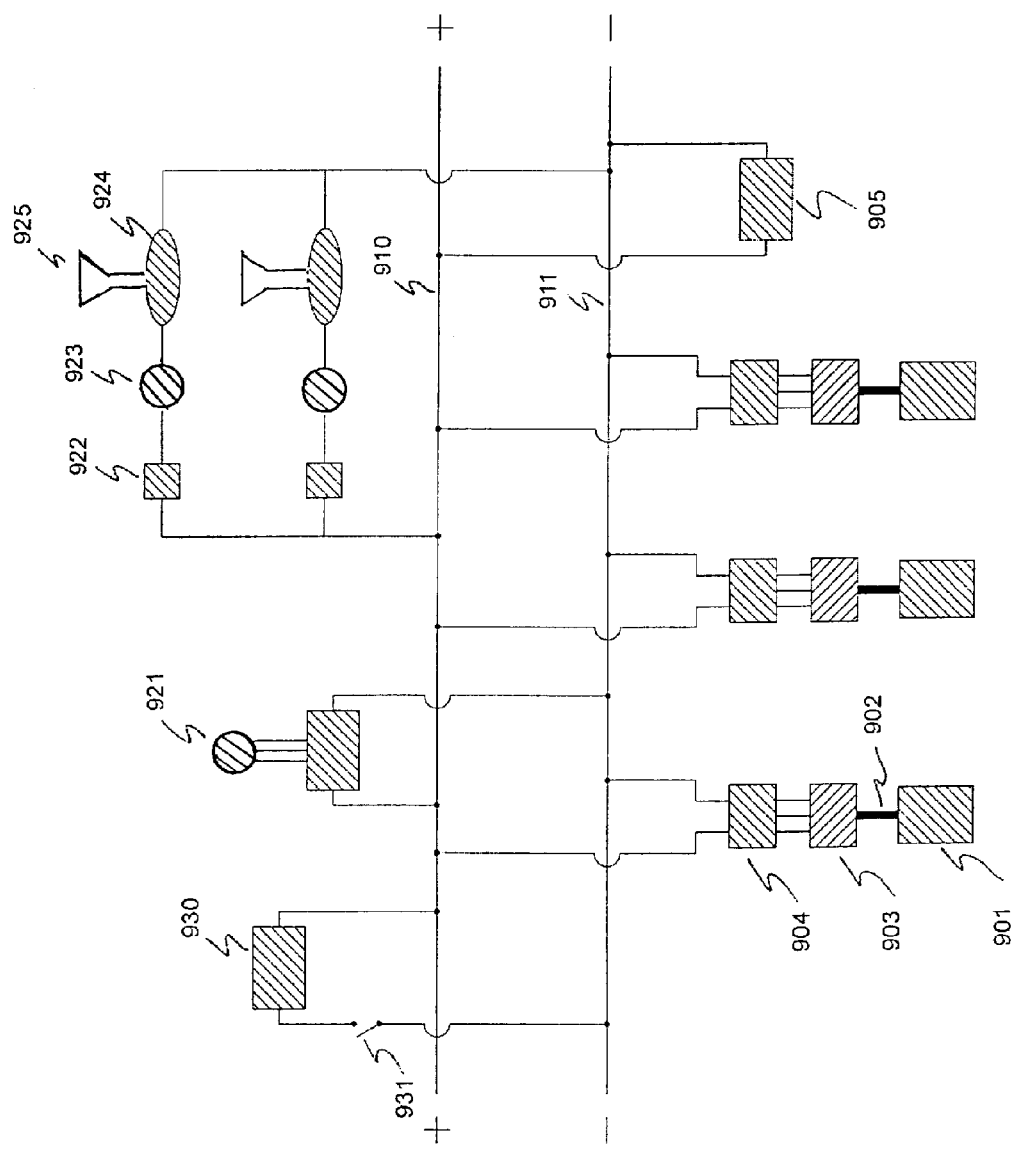
FIG. 9 is a schematic block diagram of a jet propulsion system for a hybrid barge with regenerative braking.

FIG. 9 is a schematic block diagram of a jet propulsion system for a hybrid barge with regenerative braking. In this configuration, three engines 901 and an energy storage unit 905 connected in parallel to a DC bus represented by a positive bus bar 910 and a negative bus bar 911. The engines are the prime power sources in the propulsion system. Mechanical shafts 902 of engines 901 drive alternators 903 whose AC output is rectified by rectifier circuits 904 which are in turn connected to the DC bus. An auxiliary power supply 921 for the craft is shown connected to the DC bus by a voltage reduction apparatus. A dissipating electrical grid 930 is also shown connected to the DC bus and is used for dynamic braking when switch 931 is closed. In this example, two propulsion units each providing water jet thrust from its own thruster 925 are shown. Propulsion motors 923 and pumps 924 are shown connected in parallel to the DC bus, each via an electrical energy converter 922 which is an inverter when propulsion motor 923 is an AC motor and a chopper circuit when propulsion motor 923 is an DC motor. In propulsion mode, the motors 923 provide power to the pumps 924 which energize water to provide propulsive and/or steering thrust via thrusters 925 as is well known in marine jet propulsion systems. In braking mode, the pumps 924 are operated as turbines which in turn operate the motors 923 as generators to provide electrical power back to the DC bus. The electrical circuits capable of providing dynamic and/or regenerative braking action are described in "Regenerative Braking Methods for a Hybrid Locomotive", Donnelly et al, filed Aug. 9, 2005 as U.S. Ser. No. 11/200,879 and in "Dynamic Braking for a Hybrid Locomotive", Donnelly and Tarnow, filed Apr. 19, 2006 as U.S. Provisional 60/745,153, both of which are incorporated herein by reference.

In braking mode, the pumps are operated as turbines and extract energy from the water entering the forward inlet. This extracted energy can converted into electrical energy and stored energy in the energy storage system such as, for example, a battery pack or a capacitor bank. If no energy storage capacity is available, the energy can be dissipated in an electrically resistive grid such as used on diesel locomotives with dynamic braking. Such as dissipating grid can be mounted on the craft under water so that it can be cooled by water through well-known heat exchanger methods.

In braking mode, when the water enters the inlet, the turbines extract energy from the water and cause a back pressure that results in less water flowing through the system and a net retarding force acting to slow the craft.

Figure 10:
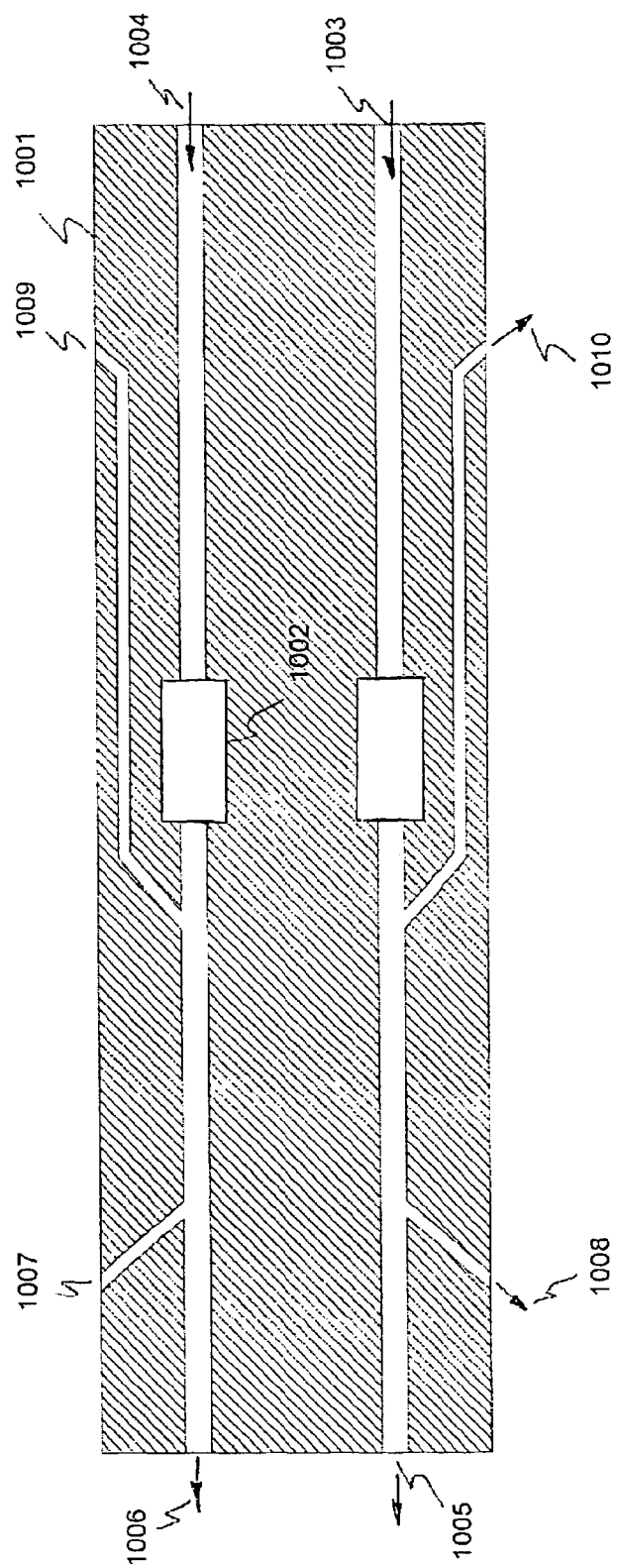
FIG. 10 is a schematic plan view of a barge with a jet propulsion system in motoring mode.

FIG. 10 is a schematic plan view of a barge such as described above with a jet propulsion system in motoring mode. Water 1004 enters the forward inlets 1003 and is energized by pump 1002 and then is propelled out of the main propulsion nozzles 1005, which are above the water line, as a high velocity stream of water 1006 to provide propulsive thrust. The energized water may also be directed by switching large valves to direct the propulsive water discharge through side ports 1007 and 1008 to provide a sideways thrust or a steering thrust, depending on which side thrusting ports are activated. A high velocity water stream 1008 would tend to swing the rear of the barge towards the top of the page. A high velocity water stream 1010 would tend to swing the front of the barge towards the top of the page. High velocity water streams 1008 and 1010 simultaneously would tend to move the entire barge sideways towards the top of the page.

Figure 11:
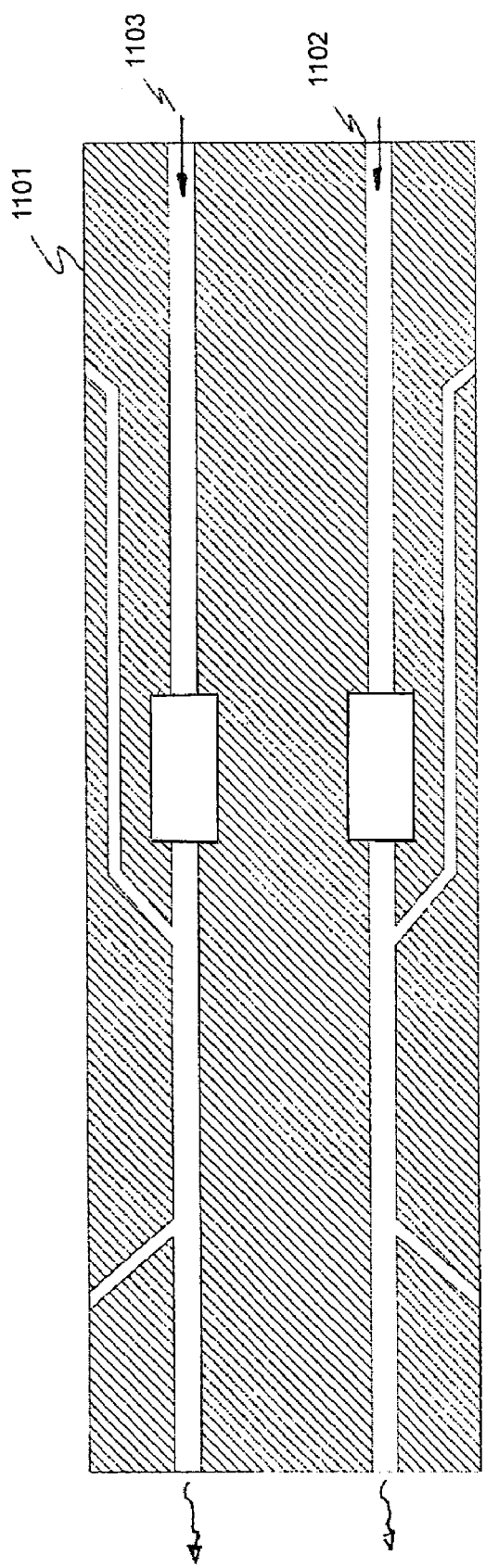
FIG. 11 is a schematic plan view of a barge with a jet propulsion system in braking mode.

FIG. 11 is a schematic plan view of a barge with a jet propulsion system in braking mode. Water 1103 enters the forward inlets 1102 and is de-energized by the pump now acting as a turbine. The de-energized water is then discharged at low velocity out of the main propulsion nozzles or through the side ports.

Figure 12:
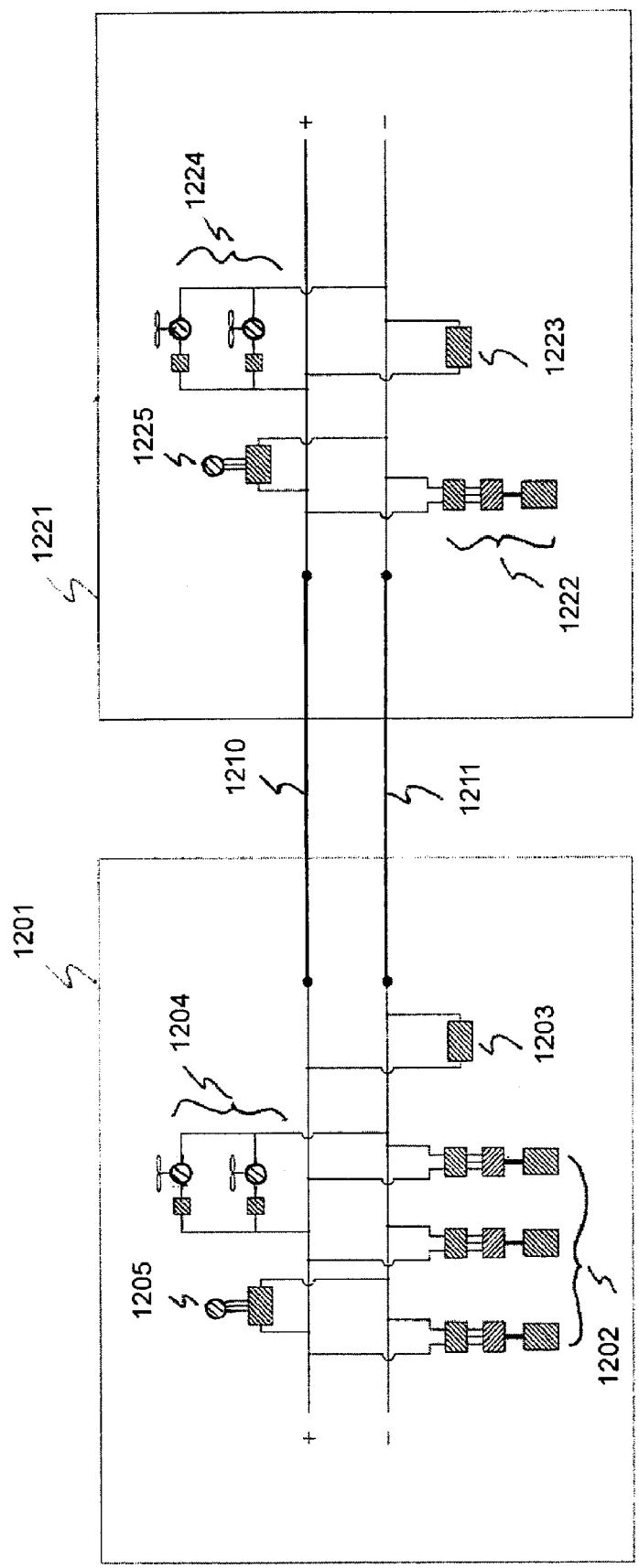
FIG. 12 is a schematic block diagram of a hybrid tugboat exchanging power with a hybrid barge.

FIG. 12 is a schematic block diagram of a hybrid tugboat exchanging power with a hybrid barge. This figure shows a schematic block diagram of a propulsion system for a multi-engine hybrid marine tugboat 1201 craft comprised of a three engines 1202 and an energy storage unit 1203 connected in parallel to a DC bus represented by a positive bus bar 1210 and a negative bus bar 1211. An auxiliary power supply 1205 and two propulsion units 1204 each turning its own screw are shown connected in to the DC bus. Tugboat 1201 is similar to the craft illustrated in FIG. 3.

This figure also shows a schematic block diagram of a propulsion system for a hybrid barge comprised of a single engine 1222 and an energy storage unit 1223 connected in parallel to the DC bus represented by a positive bus bar 1210 and a negative bus bar 1211. An auxiliary power supply 1225 for the barge and two propulsion units 1224 each turning its own screw are also shown. The tug DC buses of the and the barge are electrically connected as shown so that energy and power can be exchanged between the two craft.

For example, the barge can have a modest size engine 1222 and a large energy storage unit 1223 which would allow it to move about at low speeds near its point of loading and unloading. The engine 1222 and energy storage system 1223 can be used, for example, to allow the barge to dump or assist in unloading as well as maneuvering into position. The energy storage system 1223 alone can be used to operate the auxiliary power system 1225. When required, the energy storage system 1223 can be charged by the engine 1222.

The tug, for example, may have two large engines 1202 and a moderate size energy storage unit 1203. With the tug 1201 and barge 1221 electrically connected, the tug can provide most of the propulsion power with its two engines 1202 and can increase propulsive power when needed by controlling the propulsion system of the barge which, because of its large energy storage system 1223, can generate a large surge of propulsive power with little or no lag time. Alternately, the tug can slow the barge down more effectively by reversing the direction of its twin screws at full power and control the barge to reverse its twin screws with a large surge of propulsive power from its energy storage unit 1223 again with little or no lag time.

The present invention, in various embodiments, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, for example for improving performance, achieving ease and\or reducing cost of implementation. The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention. Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A marine power system comprising:
   i) at least one motor for driving a propulsion unit having a propulsion unit average power and a propulsion unit peak power;
   ii) at least one energy storage unit for storing electric energy and supplying said electric energy to the at least one motor, having an energy storage capacity and an energy storage unit output power;
   iii) at least one prime power system having a prime power system rated power, being electrically connected to the at least one energy storage unit and the at least one motor for selectively providing electrical energy to the at least one energy storage unit and to the at least one motor;
   iv) a bus electrically connecting the at least one energy storage unit, the at least one prime power system and the at least one motor; and
   v) a control system for controlling the operation of the at least one prime power system and the propulsion unit, and for monitoring the at least one energy storage unit, wherein the at least one motor selectively receives operational energy from the at least one energy storage unit and the at least one prime power system, the at least one motor supplies regenerative braking energy to the bus when the propulsion unit collects energy from water passing by the propulsion unit, and wherein the ratio of the at least one prime power system rated power to the propulsion unit peak power is between 0.1 and 0.8.

2. The marine power system of claim 1, further comprising an alternator driven by the at least one prime power system, the alternator being electrically connected to the bus, wherein the at least one energy storage system provides starting power for the at least one prime power system.

3. The marine power system of claim 1, further comprising:
   a plurality of electrical energy converters operable to convert energy to electrical energy having a desired electrical characteristic, the plurality of electrical energy converters comprising first and second electrical energy converters having respectively first and second output voltages and first and second output currents, the plurality of electrical energy converters being electrically connected to the bus,
   wherein a plurality of prime power systems provide energy to the plurality of electrical energy converters, the plurality of prime power systems comprising first and second engines corresponding respectively to the first and second electrical energy converters; the bus being operable to transport electrical energy from the electrical energy converters to the at least one motor, and wherein, at a selected time, the relationship between at least one of a current level and a voltage level of the bus on the one hand and at least one of the first and second output currents and the first and second output voltages of the first and second electrical energy converters on the other hand determines, at the selected time, which of the first and second engines supplies energy to the bus through the corresponding electrical energy converter.

4. The marine power system of claim 1 wherein the at least one prime power system comprises a prime power source selected from the group consisting of engines, diesel engines, gas turbine engines, microturbines, Stirling engines, spark ignition engines, fuel cells, solar cells, grid power, power induction systems, wind turbines and a combination thereof.

5. The marine power system of claim 1 wherein the energy storage unit comprises an energy storage system selected from the group consisting of a battery pack, a bank of capacitors, a compressed air storage system, a hydraulic accumulator, one or more flywheels and a combination thereof.

6. The marine power system of claim 1 wherein the energy storage unit forms part of a ballast in a marine vehicle.

7. The marine power system of claim 1 further comprising a power-dissipating load for dissipating excess regenerative braking energy on the electrical bus, wherein the power-dissipating load is mounted on a marine vehicle under water.

8. The marine power system of claim 1 further comprising an auxiliary power system connected to the electrical bus.

9. The marine power system of claim 1 wherein the control system comprises a controller selected from the group consisting of analog devices, programmable logic controllers and computers.

10. The marine power system of claim 1, wherein the at least one energy storage unit and the at least one prime power system are sized and provided in a form adapted to retrofit with an existing receiving means on a marine vehicle for receiving a diesel engine and a generator set.

11. The marine power system of claim 1 wherein the at least one energy storage unit provides power regulation to the at least one prime power system.

12. The marine power system of claim 1, wherein the propulsion unit comprises a drive system selected from the group consisting of screws, propellers, and jet pumps.

13. The marine power system of claim 1, wherein the at least one prime power system and the at least one energy storage system each comprise:
   a generator operable to convert mechanical energy output by the at least one prime power system into electrical energy; and
   an electrical converter operable to convert the outputted generator electrical energy into direct current electrical energy and to permit electrical energy to flow reversibly in each of two directions;
   wherein, at a selected time, the at least one prime power system is turned off and the at least one energy storage system is turned on, wherein the electrical converter of the at least one energy storage system is switched to provide electrical energy to the bus at a selected voltage level, and the electrical converter of the at least one prime power system is switched to receive electrical energy from the bus at the selected voltage level, whereby the at least one prime power system is activated using electrical energy supplied, via the bus, by the at least one energy storage system.

14. The marine power system of claim 1, wherein the at least one prime power system is located on a first vessel and the at least one energy storage system is located on a second vessel being displaced by the first vessel.

15. The marine power system of claim 14, wherein the first vessel is a tugboat and the second vessel is a barge.

16. A marine power system comprising:
   i) at least one motor for driving a propulsion unit having a propulsion unit average power and a propulsion unit peak power;
   ii) at least one prime power system driving a mechanical power system output shaft connected to the at least one motor through a mechanical transmission;
   iii) at least one alternator driven by the at least one prime power system output shaft;
   iv) at least one energy storage unit for storing electric energy and being connected to the at least one alternator, having an energy storage capacity and an energy storage unit output power;
   v) a bus electrically connecting the at least one energy storage unit, and the at least one alternator; and
   vi) a control system for controlling the operation of the at least one prime power system and the propulsion unit, and for monitoring the at least one energy storage unit,
   wherein the at least one energy storage system provides starting power for the at least one prime power system, and wherein the ratio of the at least one prime power system rated power to the propulsion unit peak power is between 0.5 and 1.0.

17. The marine power system of claim 13, wherein the at least one prime power system is located on a first vessel and the at least one energy storage system is located on a second vessel being displaced by the first vessel.

18. The marine power system of claim 17, wherein the first vessel is a tugboat and the second vessel is a barge.

19. A method of storing energy in a marine vehicle comprising the steps of:
   a) providing a marine power system comprising:
      i) at least one motor for driving a propulsion unit having a propulsion unit average power and a propulsion unit peak power;
      ii) at least one energy storage unit for storing electric energy and supplying said electric energy to said at least one motor, having an energy storage capacity and an energy storage unit output power;
      iii) at least one prime power system having a prime power system rated power, being electrically connected to the at least one energy storage unit and the at least one motor for selectively providing electrical energy to the at least one energy storage unit and to the at least one motor;
      iv) a bus electrically connecting the at least one energy storage unit, the at least one prime power system and the at least one motor; and
      v) a control system for controlling the operation of the at least one prime power system and the propulsion unit, and for monitoring the at least one energy storage unit,
   b) selectively providing to the at least one motor operational energy from the at least one energy storage unit and the at least one prime power system; and
   c) supplying regenerative braking energy from the at least one motor to the electrical bus when the propulsion unit collects energy from water passing by the propulsion unit, the ratio of the at least one prime power system rated power to the propulsion unit peak power being between 0.1 and 0.8.

20. The method of storing energy in a marine vehicle according to claim 19, wherein the at least one prime power system is located on a first vessel and the at least one energy storage system is located on a second vessel being displaced by the first vessel.

21. The marine power system of claim 1, further comprising at least one supplementary regenerative braking power source electrically connected to the bus and wherein the regenerative power source supplies further regenerative braking energy to the bus.

22. The marine power system of claim 21, wherein the at least one supplementary regenerative braking power source is selected from the group consisting a winch system and a crane system.

* * * * *